United States Patent

Shibata

(10) Patent No.: US 10,498,149 B2
(45) Date of Patent: Dec. 3, 2019

(54) RECHARGEABLE BATTERY PROTECTION INTEGRATED CIRCUIT, RECHARGEABLE BATTERY PROTECTION DEVICE, AND BATTERY PACK

(71) Applicant: Kohei Shibata, Tokyo (JP)

(72) Inventor: Kohei Shibata, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/138,290

(22) Filed: Sep. 21, 2018

(65) Prior Publication Data

US 2019/0181660 A1 Jun. 13, 2019

(30) Foreign Application Priority Data

Dec. 8, 2017 (JP) .................................. 2017-236116

(51) Int. Cl.
*H01J 7/00* (2006.01)
*H01M 10/44* (2006.01)
*H01M 10/42* (2006.01)
*H02J 7/00* (2006.01)

(52) U.S. Cl.
CPC ........ *H02J 7/0026* (2013.01); *H01M 10/4257* (2013.01); *H01M 10/44* (2013.01); *H01M 2010/4271* (2013.01)

(58) Field of Classification Search
CPC ................................................ H02J 7/0026
USPC ........................................................ 320/134
See application file for complete search history.

(56) References Cited

U.S. PATENT DOCUMENTS

| | | | |
|---|---|---|---|
| 5,742,148 A * | 4/1998 | Sudo | H02J 7/0011 320/118 |
| 2013/0057221 A1* | 3/2013 | Shibata | H02J 7/0029 320/134 |

FOREIGN PATENT DOCUMENTS

JP 2013-055759 3/2013

* cited by examiner

*Primary Examiner* — David V Henze-Gongola
(74) *Attorney, Agent, or Firm* — IPUSA, PLLC

(57) ABSTRACT

A battery protection circuit protects a rechargeable battery from overdischarge, by turning off a transistor inserted in series in a current path between a negative electrode of the battery and a negative terminal coupled to ground of a load or a charger. A detection circuit detects a power source voltage between power source and ground terminals, and a control circuit pulls down a monitor terminal potential to a ground terminal potential by turning off the transistor and stopping battery discharge when the power source voltage lower than an overdischarge detection voltage is detected. The control circuit cancels pull-down of the monitor terminal potential to the ground terminal potential when the power source voltage higher than an overdischarge reset voltage is not detected until a predetermined time elapses in a state in which the battery discharge is stopped and the monitor terminal potential is pulled down to the ground terminal potential.

20 Claims, 4 Drawing Sheets

RECHARGEABLE BATTERY PROTECTION INTEGRATED CIRCUIT, RECHARGEABLE BATTERY PROTECTION DEVICE, AND BATTERY PACK

CROSS-REFERENCE TO RELATED APPLICATIONS

This application is based on and claims priority to Japanese Patent Application No. 2017-236116 filed on Dec. 8, 2017, the entire contents of which are incorporated herein by reference.

BACKGROUND OF THE INVENTION

1. Field of the Invention

The present invention relates to a rechargeable battery protection integrated circuit, a rechargeable battery protection device, and a battery pack.

2. Description of the Related Art

Conventionally, there is a known semiconductor integrated circuit that stops charging of the rechargeable battery when an overdischarge of the rechargeable battery is detected, and after removal of a load connected to the rechargeable battery is detected, cancels stopping the charging of the rechargeable battery. The known semiconductor integrated circuit includes a terminal for detecting removal of the load, that is connected via a resistor to the ground of a charger or the load. Such a semiconductor integrated circuit is proposed in Japanese Laid-Open Patent Publication No. 2013-055759, for example.

In the conventional semiconductor integrated circuit including the terminal for detecting the removal of the load, the discharge of the rechargeable battery is stopped by turning off a discharge control transistor when the overdischarge is detected. In addition, the terminal for detecting the removal of the load is connected to and pulled down by a VSS terminal via a pull-down resistor, in order to enable detecting the removal of the load.

However, when the load continues to be connected to the rechargeable battery without being removed, a small current continues to successively flow through a path (or route) that includes a positive electrode of the rechargeable battery, the load, the terminal for detecting the removal of the load, the pull-down resistor, the VSS terminal, and a negative electrode of the rechargeable battery.

SUMMARY OF THE INVENTION

Embodiments of the present invention can provide a rechargeable battery protection integrated circuit, a rechargeable battery protection device, and a battery pack, capable of preventing the small current from flowing from rechargeable battery in a discharge state of the rechargeable battery.

According to one aspect of embodiments of the present invention, a rechargeable battery protection integrated circuit that protects a rechargeable battery from overdischarge, by turning off a discharge control transistor inserted in series in a current path between a negative electrode of the rechargeable battery and a negative terminal that is coupled to ground of a load or a charger, includes a power source terminal configured to electrically connect to a positive electrode of the rechargeable battery; a ground terminal configured to electrically connect to the negative electrode of the rechargeable battery; a monitor terminal configured to electrically connect to the negative terminal; a detection circuit configured to detect a power source voltage between the power source terminal and the ground terminal; and a control circuit configured to pull down a potential of the monitor terminal to a potential of the ground terminal by turning off the discharge control transistor and stopping discharge of the rechargeable battery, in a case in which the detection circuit detects the power source voltage lower than an overdischarge detection voltage, wherein the control circuit cancels pull-down of the potential of the monitor terminal to the potential of the ground terminal, in a case in which the power source voltage higher than an overdischarge reset voltage is not detected by the detection circuit until a predetermined time elapses in a first state in which the discharge of the rechargeable battery is stopped and the potential of the monitor terminal is pulled down to the potential of the ground terminal.

According to another aspect of the embodiments of the present invention, a rechargeable battery protection device includes a discharge control transistor inserted in series in a current path between a negative electrode of a rechargeable battery and a negative terminal that is coupled to ground of a load or a charger; and a rechargeable battery protection integrated circuit that protects the rechargeable battery from overdischarge, by turning off the discharge control transistor, wherein the rechargeable battery protection integrated circuit includes a power source terminal configured to electrically connect to a positive electrode of the rechargeable battery; a ground terminal configured to electrically connect to the negative electrode of the rechargeable battery; a monitor terminal configured to electrically connect to the negative terminal; a detection circuit configured to detect a power source voltage between the power source terminal and the ground terminal; and a control circuit configured to pull down a potential of the monitor terminal to a potential of the ground terminal by turning off the discharge control transistor and stopping discharge of the rechargeable battery, in a case in which the detection circuit detects the power source voltage lower than an overdischarge detection voltage, wherein the control circuit cancels pull-down of the potential of the monitor terminal to the potential of the ground terminal, in a case in which the power source voltage higher than an overdischarge reset voltage is not detected by the detection circuit until a predetermined time elapses in a first state in which the discharge of the rechargeable battery is stopped and the potential of the monitor terminal is pulled down to the potential of the ground terminal.

According to still another aspect of the embodiments of the present invention, a battery pack includes a rechargeable battery; a discharge Control transistor inserted in series in a current path between a negative electrode of the rechargeable battery and a negative terminal that is coupled to ground of a load or a charger; and a rechargeable battery protection integrated circuit that protects the rechargeable battery from overdischarge, by turning off the discharge control transistor, wherein the rechargeable battery protection integrated circuit includes a power source terminal configured to electrically connect to a positive electrode of the rechargeable battery; a ground terminal configured to electrically connect to the negative electrode of the rechargeable battery; a monitor terminal configured to electrically connect to the negative terminal; a detection circuit configured to detect a power source voltage between the power source terminal and the ground terminal; and a control circuit configured to pull down a potential of the monitor terminal to a potential of the ground terminal by turning off the discharge control transistor and stopping discharge of the rechargeable battery, in a case in which the detection circuit detects the power source voltage lower than an overdischarge detection voltage, wherein the control circuit cancels pull-down of the potential of the monitor terminal to the potential of the ground terminal, in a case in which the power source voltage higher than an overdischarge reset voltage is not detected by the detection circuit until a predetermined time elapses in a first state in which the discharge of the rechargeable battery is stopped and the potential of the monitor terminal is pulled down to the potential of the ground terminal.

Other objects and further features of the present invention will be apparent from the following detailed description when read in conjunction with the accompanying drawings.

DESCRIPTION OF THE PREFERRED EMBODIMENTS

Figure 1:
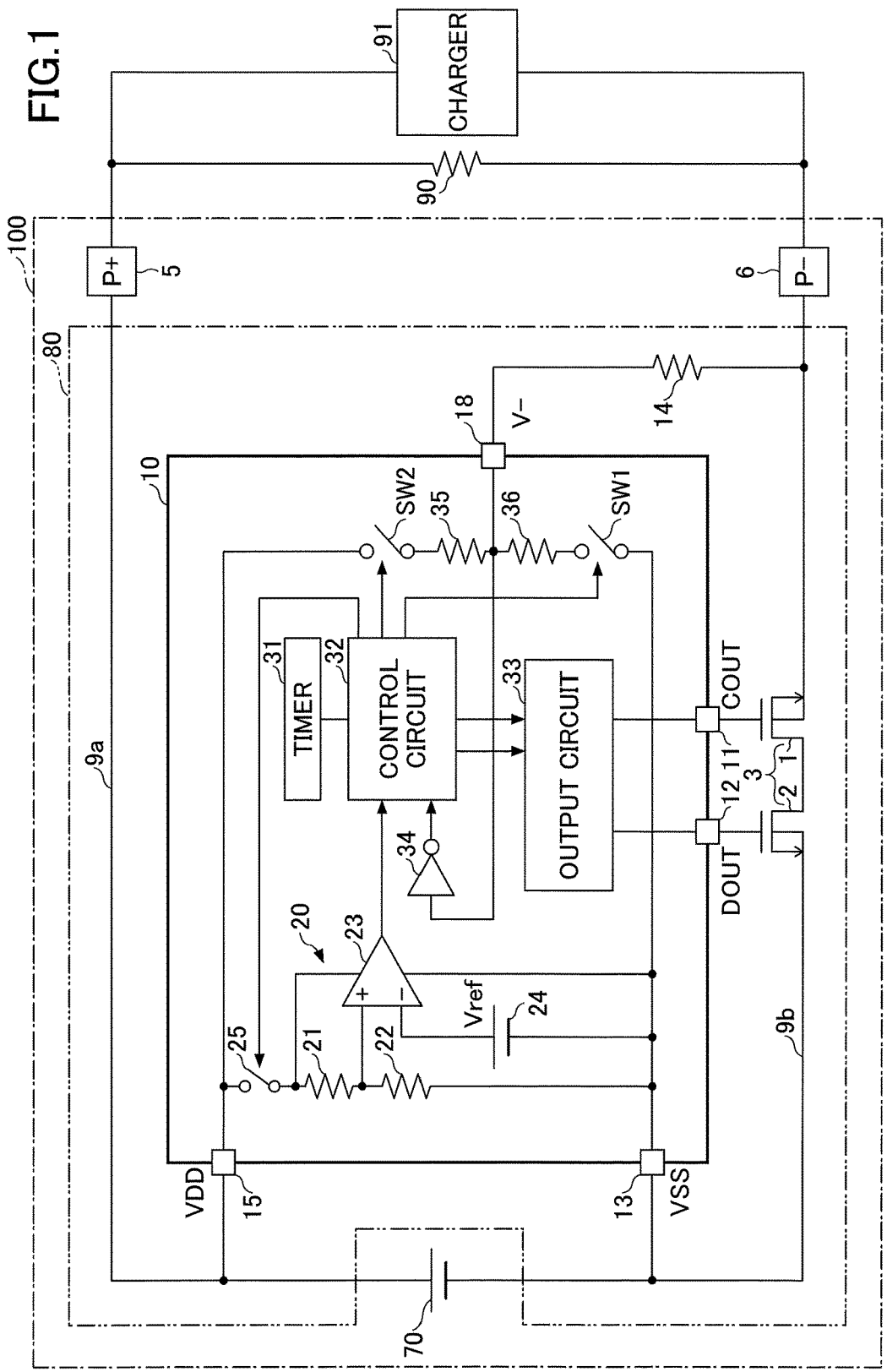
FIG. 1 is a diagram illustrating a structure of an example of a battery pack.

Embodiments of a rechargeable battery protection integrated circuit, a rechargeable battery protection device, and a battery pack according to the present invention will be described, by referring to the drawings.

FIG. 1 is a diagram illustrating a structure of an example of a battery pack. A battery pack 100 illustrated in FIG. 1 includes a rechargeable battery 70, and a battery protection device 80.

The rechargeable battery 70 is an example of a secondary battery that is chargeable and dischargeable. The rechargeable battery 70 can supply power to a load 90 that is connected to a positive terminal 5 (P+ terminal) and a negative terminal 6 (P− terminal). The rechargeable battery 70 can be charged by a charger 91 that is connected to the positive terminal 5 and the negative terminal 6. Examples of the rechargeable battery 70 include a lithium ion battery, a lithium polymer battery, or the like. The battery pack 100 may be included in the load 90, that is, built-in to the load:90. Alternatively, the battery pack 100 may be connected externally to the load 90.

The load 90 is an example of a load that uses the rechargeable battery 70 of the battery pack 100 as a power source. Examples of the load 90 include electric appliances such as an electric power tool, electronic devices such as a portable terminal device, or the like. The electronic devices may include a mobile phone, a smart phone, a computer, a game device, a television set, camera, or the like. Of course, the load 90 is not limited to the devices described above.

The battery protection device 80 is an example of a rechargeable battery protection device that operates using the rechargeable battery 70 as a power source. The battery protection device 80 controls charging and discharging of the rechargeable battery 70, to protect the rechargeable battery 70 from overcharge, overdischarge, or the like. The battery protection device 80 includes the positive terminal 5, the negative terminal 6, a switch circuit 3, and a battery protection circuit 10.

The positive terminal 5 is an example of a terminal that may be connected to a power source terminal of the charger 91 or the load 90. The negative terminal 6 is an example of a terminal that may be connected to the ground of the charger 91 or the load 90.

A positive electrode of the rechargeable battery 70 and the positive terminal 5 are connected by a positive current path 9a, and a negative electrode of the rechargeable battery 70 and the negative terminal 6 are connected by a negative current path 9b. The positive current path 9a is an example of a charging and discharging current path between the positive electrode of the rechargeable battery 70 and the positive terminal 5. The negative current path 9b is an example of a charging and discharging current path between the negative electrode of the rechargeable battery 70 and the negative terminal 6.

The switch circuit 3 is inserted in series to the negative current path 9b between the negative electrode of the rechargeable battery 70 and the negative terminal 6 that may be connected to the ground of the charger 91 or the load 90.

The switch circuit 3 includes a charge control transistor 1, and a discharge control transistor 2, for example. The charge control transistor 1 is an example of a charging path cutoff part that cuts off a charging path of the rechargeable battery 70. The discharge control transistor 2 is an example of a discharging path cutoff part that cuts off a discharging path of the rechargeable battery 70. In the example illustrated in FIG. 1, the charge control transistor 1 cuts off the negative current path 9b in which a charging current of the rechargeable battery 70 flows. In addition, the discharge control transistor 2 cuts off the negative current path 9b in which a discharging current of the rechargeable battery 70 flows. The control transistors 1 and 2 are switching elements that switches between a conducting state and a cutoff state of the negative current path 9b, and are inserted in series to the negative current path 9b. The control transistors 1 and 2 are N-channel MOS (Metal Oxide Semiconductor) transistors, for example.

The battery protection circuit 10 is an example of a rechargeable battery protection integrated circuit. The battery protection circuit 10 turns off the switch circuit 3, to perform a protecting operation on the rechargeable battery 70. The battery protection circuit 10 is an IC (Integrated Circuit) that operates at a battery voltage (hereinafter also referred to as a "cell voltage") between the positive electrode and the negative electrode of the rechargeable battery 70. The battery protection circuit 10 includes a charge control terminal 11 (COUT terminal), a discharge control terminal 12 (DOUT terminal), a monitor terminal 18 (V− terminal), a power source terminal 15 (VDD terminal), and a ground terminal 13 (VSS terminal), for example.

The charge control terminal 11 (COUT terminal) is connected to a gate of the charge control transistor 1, and outputs a signal that turns the charge control transistor 1 on or off. The discharge control terminal 12 (DOUT terminal) is connected to a gate of the discharge control transistor 2, and outputs a signal that turns the discharge control transistor 2 on or off.

The monitor terminal 18 (V− terminal) is used to monitor a potential of the negative terminal 6, and is connected to the negative terminal 6. The monitor terminal 18 (V− terminal) is used by a control circuit 32 to monitor an existence of a connection of the charger 91 or the load 90 to the terminals 5 and 6, for example. The monitor terminal 18 (V− terminal) is connected to the negative current path 9b via a resistor 14, between the negative terminal 6 and the control transistors 1 and 2.

The power source terminal 15 (VDD terminal) is a power source terminal of the battery protection circuit 10, and is connected to the positive electrode of the rechargeable battery 70 and the positive current path 9a. The ground terminal 13 (VSS terminal) is a ground terminal of the battery protection circuit 10, and is connected to the negative electrode of the rechargeable battery 70 and the negative current path 9b.

The battery protection circuit 10 includes a control circuit 32, an output circuit 33, a timer 31, a detection circuit 20, and a monitor circuit 34, for example.

In a case in which an overcharge or an overcharge current of the rechargeable battery 70 is detected, for example, the control circuit 32 outputs a signal (for example, a low-level gate control signal) that controls the charge control transistor 1 from the on state to the off state after a predetermined delay time elapses. This signal output from the control circuit 32 is output from the charge control terminal 11 (COUT terminal) via the output circuit 33. The control circuit 32 turns off the charge control transistor 1, to prohibit a current in a charging direction of the rechargeable battery 70 from flowing to the negative current path 9b. Hence, the charging of the rechargeable battery 70 stops, to protect the rechargeable battery 70 from the overcharge or the overcharge current.

In a case in which an overdischarge or an overdischarge current of the rechargeable battery 70 is detected, for example, the control circuit 32 outputs a signal (for example, a low-level gate control signal) that controls the discharge control transistor 2 from the on state to the off state after a predetermined delay time elapses. This signal output from the control circuit 32 is output from the discharge control terminal 12 (DOUT terminal) via the output circuit 33. The control circuit 32 turns off the discharge control transistor 2, to prohibit a current in a discharging direction of the rechargeable battery 70 from flowing to the negative current path 9b. Hence, the discharging of the rechargeable battery 70 stops, to protect the rechargeable battery 70 from the overdischarge or the overdischarge current.

The control circuit 32 may be formed by a plurality of analog logic circuits, without using a CPU (Central Processing Unit), for example.

The output circuit 33 is a circuit for driving the switch circuit 3. More particularly, the output circuit 33 includes a driving circuit part that drives the charge control transistor 1, and a driving circuit part that drives the discharge control transistor 2.

The timer 31 is used to measure the predetermined delay time. The timer 31 includes a counter circuit that counts a predetermined pulse signal that is input, for example.

The detection circuit 20 monitors a power source voltage Vd that is a voltage between the power source terminal 15 (VDD terminal) and the ground terminal 13 (VSS terminal). The power source terminal 15 (VDD terminal) is connected to the positive electrode of the rechargeable battery 70, and the ground terminal 13 (VSS terminal) is connected to the negative electrode of the rechargeable battery 70. The power source voltage Vd is approximately equal to the cell voltage of the rechargeable battery 70. Accordingly, the detection circuit 20 can detect the cell voltage of the rechargeable battery 70, by monitoring the power source voltage Vd.

In a case in which the power source voltage Vd that is lower than a predetermined overdischarge detection voltage Vdet is detected, the detection circuit 20 outputs an overdischarge detection signal that indicates that the power power source voltage Vd that is lower than the predetermined overdischarge detection voltage Vdet is detected. In addition, in a case in which the power source voltage Vd that is higher than a predetermined overdischarge reset voltage Vrel is detected, the detection circuit 20 outputs an overdischarge reset detection signal that indicates that the power source voltage Vd that is higher than the predetermined overdischarge reset voltage Vrel is detected. The overdischarge detection voltage Vdet is a threshold value that is used to detect the overdischarge. The overdischarge reset voltage Vrel is a threshold value that is used to detect the overdischarge reset. The overdischarge reset voltage Vrel is set to a voltage value higher than the overdischarge detection voltage Vdet.

The detection circuit 20 includes resistors 21 and 22, a comparator 23, and a reference voltage generator 24, for example. In an on state of a switch 25 that will be described later, the comparator 23 compares a divided voltage of the power source voltage Vd that is divided by a resistance voltage divider formed by the resistors 21 and 22, and a reference voltage Vref generated by the reference voltage generator 24. The comparator 23 outputs a comparison result to the control circuit 32. The overdischarge detection voltage Vdet and the overdischarge reset voltage Vrel are set by the resistors 21 and 22 and the reference voltage Vref.

The monitor circuit 34 monitors a potential of the monitor terminal 18 (V− terminal), and outputs a monitored result to the control circuit 32. The monitor 34 is a CMOS (Complementary MOS) inverter, for example. The monitor circuit 34 may be a circuit that monitors the potential of the monitor terminal 18 (V− terminal) using a comparator.

The battery protection circuit 10 includes a first switch SW1 and a pull-down resistor 36, for example, and the first switch SW1 and the pull-down resistor 36 are inserted in series to the current path between the monitor terminal 18 (V− terminal) and the ground terminal 13 (VSS terminal). When the first switch SW1 is turned on by the control circuit 32, a potential of the monitor terminal 18 (V− terminal) is pulled down via the pull-down resistor 36 to a potential of the ground terminal 13 (VSS terminal). When the first switch SW1 is turned off by the control circuit 32, the state in which the potential of the monitor terminal 18 (V− terminal) is pulled down via the pull-down resistor 36 to the potential of the ground terminal 13 (VSS terminal) is canceled.

In addition, the battery protection circuit 10 includes second switch SW2 and a pull-up resistor 35, for example, and the second switch SW2 and the pull-up resistor 35 are inserted in series to the current path between the monitor terminal 18 (V− terminal) and the power source terminal 15 (VDD terminal). When the second switch SW2 is turned on by the control circuit 32, the potential of the monitor terminal 18 (V− terminal) is pulled up via the pull-up resistor 35 to a potential of the power source terminal 15 (VDD terminal). When the second switch SW2 is turned off by the control circuit 32, the state in which the potential of the monitor terminal 18 (V− terminal) is pulled up via the pull-up resistor 35 to the potential of the power source terminal 15 (VDD terminal) is canceled.

In this embodiment, in the case in which the detection circuit 20 detects the power source voltage Vd that is lower than the overdischarge detection voltage Vdet, the control circuit 32 turns off the discharge control transistor 2 to stop the discharge of the rechargeable battery 70. Hence, it is possible to prohibit the discharge of the rechargeable battery 70 in the overdischarge state. In addition, in the case in which the detection circuit 20 detects the power source voltage Vd that is lower than the overdischarge detection voltage Vdet, the control circuit 32 turns on the first switch SW1 to pull down the potential of the monitor terminal 18 (V− terminal) to the potential of the ground terminal 13 (VSS terminal). The control circuit 32 pulls down the potential of the monitor terminal 18 (V− terminal) to the potential of the ground terminal 13 (VSS terminal), and monitors the existence of the connection of the load 90 to the terminals 5 and 6.

In the state in which the overdischarge of the rechargeable battery 70 is detected, there should be no connection of the charger 91 to the terminals 5 and 6. A state in which the discharge of the rechargeable battery 70 is stopped by the discharge control transistor 2 that is turned off, and the potential of the monitor terminal 18 (V− terminal) is pulled down to the potential of the ground terminal 13 (VSS terminal) by the first switch SW1 that is turned on, will hereinafter be referred to as a "pull-down state s1". The pull-down state s1 is an example of a first state. In the pull-down state s1, the potential of the monitor terminal 18 (V− terminal) is pulled up to the potential of the power source terminal 15 (VDD terminal) by the resistor 14 and the load 90. When the load 90 is removed (more particularly, when the load 90 is disconnected from at least one of the positive terminal 5 (P+ terminal) and the negative terminal 6 (P-terminal)) in the pull-down state s1, the potential of the monitor terminal 18 (V− terminal) decreases to the potential of the ground terminal 13 (VSS terminal) because the monitor terminal 18 (V− terminal) is pulled down to the potential of the ground terminal 13 (VSS terminal). Accordingly, in a case in which the monitor circuit 34 detects that the potential of the monitor terminal 18 (V− terminal) decreased to a potential lower than a predetermined reference potential Vvm in the pull-down state s1, the control circuit 32 may judge that the load 90 is removed. The reference potential Vvm is set to a potential higher than the potential of the ground terminal 13 (VSS terminal) and lower than the potential of the power source terminal 15 (VDD terminal).

However, when the load 90 is not removed in the pull-down state s1, a small current continues to successively flow through a path (or route) that includes the positive electrode of the rechargeable battery 70, the positive terminal 5 (P+ terminal), the load 90, the resistor 14, the monitor terminal 18 (V− terminal), the pull-down resistor 36, the ground terminal 13 (VSS terminal), and the negative electrode of the rechargeable battery 70.

Hence, the control circuit 32 in one embodiment turns off the first switch SW1 in the pull-down state s1, in a case in which the detection circuit 20 does not detect the power source voltage Vd higher than the excessive discharge reset voltage Vrel before a predetermined time is elapses. In this case, the pull-down of the potential of the monitor terminal 18 (V− terminal) to the potential of the ground terminal 13 (VSS terminal) is canceled, and the path through which the small current described above flows is cut off. Accordingly, it is possible to prevent the small current from continuing to flow from the rechargeable battery 70 in the overdischarge state.

In addition, the control circuit 32 in one embodiment may change the pull-down of the potential of the monitor terminal 18 (V− terminal) to the potential of the ground terminal 13 (VSS terminal) to the pull-up of the monitor terminal 18 (V− terminal) to the potential of the power source terminal 15 (VDD terminal) in the pull-down state s1, in the case in which the detection circuit 20 does not detect the power source voltage Vd higher than the excessive discharge reset voltage Vrel before the predetermined time is elapses. In other words, the control circuit 32 may turn off the first switch SW1 and turn on the second switch SW2, to switch the pull-down of the potential of the monitor terminal 18 (V− terminal) to the potential of the ground terminal 13 (VSS terminal) to the pull-up of the monitor terminal 18 (V− terminal) to the potential of the power source terminal 15 (VDD terminal).

A state in which the discharge of the rechargeable battery 70 is stopped by the discharge control transistor 2 that is turned off, and the potential of the monitor terminal 18 (V− terminal) is pulled up to the potential of the power source terminal 15 (VDD terminal) by the second switch SW2 that is turned on, will hereinafter be referred to as a "pull-up state s2". The pull-up state s2 is an example of a second state. In the pull-up state s2, the potential of the monitor terminal 18 (V− terminal) is pulled up to the potential of the power source terminal 15 (VDD terminal) by the second switch SW that is turned on. When the charger 91 is connected between the positive terminal 5 (P+ terminal) and the negative terminal 6 (P− terminal)) in the pull-Up state s the potential of the monitor terminal 18 (V− terminal) decreases to the potential of the ground terminal 13 (VSS terminal). Accordingly, in a case in which the monitor circuit 34 detects that the potential of the monitor terminal 18 (V− terminal) decreased to a potential lower than the predetermined reference potential Vvm in the pull-up state s2, the control circuit 32 may judge that the charger 91 is connected to the terminals 5 and 6.

In addition, the control circuit 32 in one embodiment may turn on the discharge control transistor 2 and cancel stopping the discharge of the rechargeable battery 70, and cancel the pull-up of the potential of the monitor terminal 18 (V− terminal) to the potential of the power source terminal 15 (VDD terminal) in the pull-up state s2, in a case in which the connection of the charger 91 to the terminals 5 and 6 is detected based on the potential of the monitor terminal 18 (V− terminal) and the detection circuit 20 detects the power source voltage Vd higher than the overdischarge reset voltage Vrel. In this case, it is possible to permit discharge of the rechargeable battery 70 that is reset from the overdischarge state.

On the other hand, the control circuit 32 in one embodiment may monitor the existence of the connection of the load 90 to the terminals 5 and 6, via the monitor circuit 34 based on the potential of the monitor terminal 18 (V− terminal) in the pull-down state s1, in a case in which the detection circuit 20 detects the power source voltage Vd higher than the excessive discharge reset voltage Vrel before the predetermined time ts elapses. In this case, it is possible to start monitoring the existence of the connection of the load 90 to the terminals 5 and 6 without having to wait for the predetermined time ts to elapse.

For example, suppose that the control circuit 32 detects a non-existence of the connection of the load 90 to the terminals 5 and 6, via the monitor circuit 34 based on the potential of the monitor terminal 18 (V− terminal) in the pull-down state s1. In this case, the control circuit 32 may turn on the discharge control transistor 2 to cancel stopping the discharge of the rechargeable battery 70, and cancel the pull-down of the potential of the monitor terminal 18 (V− terminal) to the potential of the ground terminal 13 (VSS terminal). In this case, it is possible to permit discharge of the rechargeable battery 70 that is reset from the overdischarge state. On the other hand, suppose that the control circuit 32 does not detect the non-existence of the connection of the load 90 to the terminals 5 and 6, via the monitor circuit 34 based on the potential of the monitor terminal 18 (V− terminal) in the pull-down state s1. It this case, the control circuit 32 may maintain the discharge control transistor 2 in the off state. In this case, it is possible not to permit the discharge of the rechargeable battery 70 that is reset from the overdischarge state, unless the non-existence of the connection of the load 90 to the terminals 5 and 6 is detected (that is, unless the load 90 is disconnected)

Figure 2:
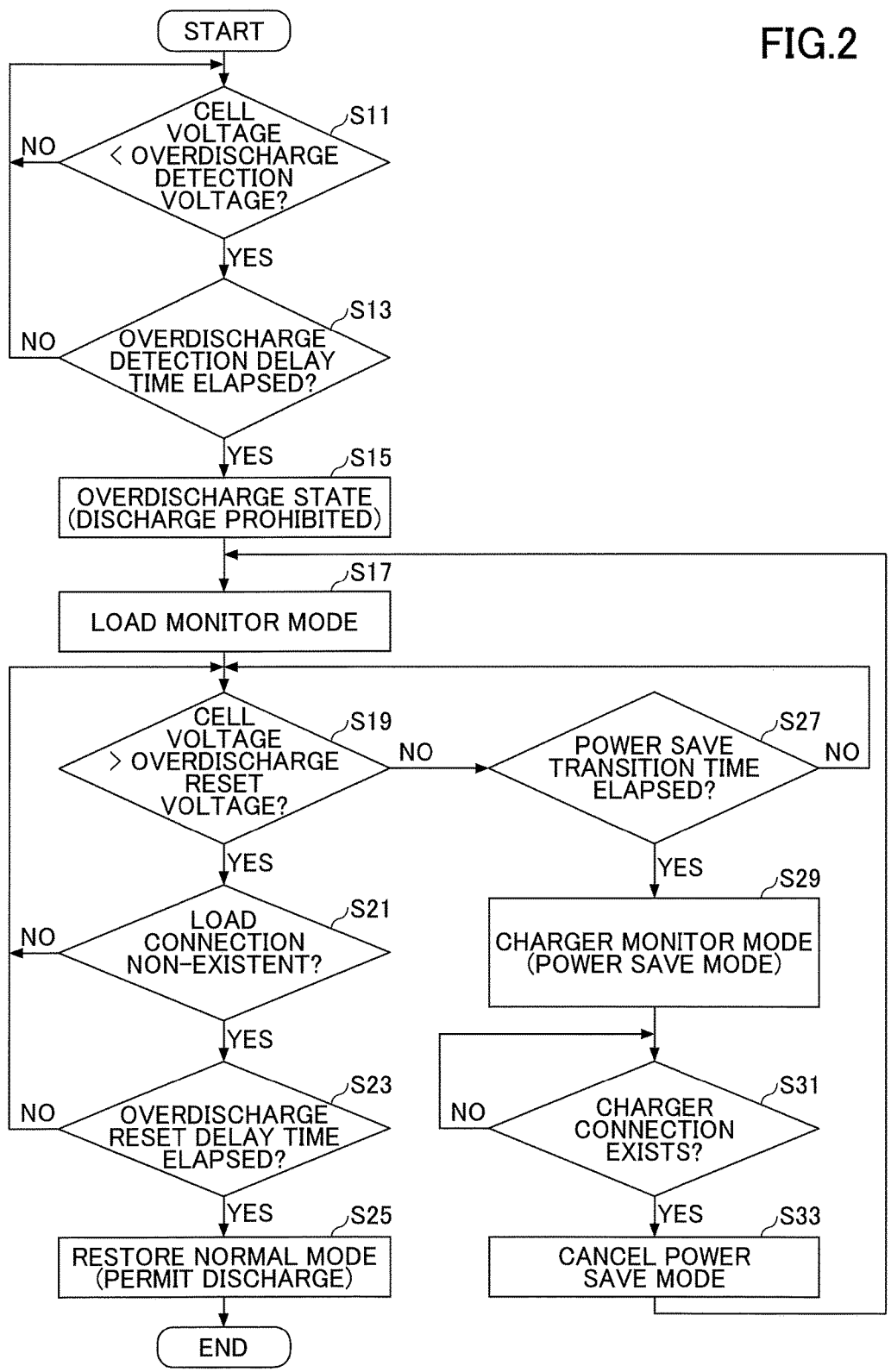
FIG. 2 is a flow chart for explaining an example of a control method that controls a rechargeable battery protection integrated circuit.

FIG. 2 is a flow chart for explaining an example of a control method that controls the battery protection circuit 10. The control method illustrated in FIG. 2 will be described with reference to FIG. 1.

In step S11 illustrated in FIG. 2, the control circuit 32 judges whether the power source voltage Vd (or "cell voltage") lower than the overdischarge detection voltage Vdet is detected by the detection circuit 20. The control circuit 32 performs a process of step S13 when the power source voltage Vd lower than the overdischarge detection voltage Vdet is detected and the judgment result in step S11 is YES. On the other hand, the control circuit 32 performs the process of step S11 again when the power source voltage Vd lower than the overdischarge detection voltage Vdet is not detected and the judgment result in step S11 is NO.

In step S13, the control circuit 32 judges whether a predetermined overdischarge detection delay time tdet has elapsed from a time when the power source voltage Vd lower than the overdischarge detection voltage Vdet is detected by the detection circuit 20. The lapse of the overdischarge detection delay time tdet is counted by the timer 31. The control circuit 32 performs the process of step S11 again when the control circuit 32 judges that the overdischarge detection delay time tdet has not elapsed and the judgment result in step S13 is NO. On the other hand, the control circuit 32 performs a process of step S15 when the overdischarge detection delay time tdet has elapsed and the judgment result in step S13 is YES.

In step S15, the control circuit 32 outputs a signal that turns off the discharge control transistor 2 to stop the discharge of the rechargeable battery 70, and outputs a signal that turns on the first switch SW1 to pull-down the potential of the monitor terminal 18 (V− terminal) to the potential of the ground terminal 13 (VSS terminal). The discharge of the rechargeable battery 70 in the overdischarge state is prohibited because the discharge control transistor 2 is turned off. In addition, the control circuit 32 monitors the existence of the connection of the load 90 to the terminals 5 and 6, by pulling down the potential of the monitor terminal 18 (V− terminal) to the potential of the ground terminal 13 (VSS terminal) by electrically connecting the terminals 19 and 13.

In step S17, the control circuit 32 controls an operation mode of the battery protection circuit 10 to make a transition to a load monitor mode in which the existence of the connection of the load 90 to the terminals 5 and 6 is monitored, in response to pulling down the potential of the monitor terminal 18 (V− terminal) to the potential of the ground terminal 13 (VSS terminal) by electrically connecting the terminals 18 and 13 in step S15.

In step S19, the control circuit 32 judges whether the power source voltage Vd (or "cell voltage") higher than the overdischarge reset voltage Vrel is detected by the detection circuit 20 in the load monitor mode. The control circuit 32 performs a process of step S27 when the power source voltage Vd higher than the overdischarge reset voltage Vrel is not detected by the detection circuit 20 and the judgment result in step S19 is NO. On the other hand, the control circuit 32 performs a process of step S21 when the power source voltage Vd higher than the overdischarge reset voltage Vrel is detected by the detection circuit 20 and the judgment result in step S19 is YES.

In step S27, the control circuit 32 judges whether a predetermined power save transition time tps has elapsed from a time when the detection circuit 20 detects the power source voltage Vd higher than the overdischarge reset voltage Vrel. The power save transition time tps is an example of the predetermined time is described above. The lapse of the power save transition time tps is counted by the timer 31. When the control circuit 32 judges that the power save transition time tps has not elapsed and the judgment result in step S27 is NO, the control circuit 32 performs the judgment process of step S19 again. On the other hand, when the control circuit 32 judges that the power save transition time tps has elapsed and the judgment result in step S27 is YES, the control circuit 32 performs a process of step S29. In step S29, the control circuit 32 controls the operation mode of the battery protection circuit 10 to make a transition to a power save mode in which a power consumption of the battery protection circuit 10 is reduced.

In step S29, the control circuit 32 changes the pull-down of the potential of the monitor terminal 18 (V− terminal) to the potential the ground terminal 13 (VSS terminal) to the pull-up of the potential of the monitor terminal 18 (V− terminal) to the potential of the power source terminal 15 (VDD terminal) and controls the operation mode of the battery protection circuit 10 to make a transition to a charger monitor mode in which the existence of the connection of the charger 91 to the terminals 5 and 6 is monitored, and cuts off the power source of the detection circuit 20 by the switch 25 and controls an operation mode of the battery protection circuit 10 to make a transition to the power save mode. In this example, the charger monitor mode and the power save mode may be the same operation mode because the charge monitor mode and the power save mode occur simultaneously. In step S29, the control circuit 32 controls the operation mode of the battery protection circuit 10 to make a transition from the pull-down state s1 to the pull-up state s2.

In other words, in the pull-down state s1, when the power source voltage Vd higher than the overdischarge reset voltage Vrel is not detected by the time the power save transition time tps elapses, the control circuit 32 pulls up the potential of the monitor terminal 18 (V-terminal) to the potential of the power source terminal 15 (VDD terminal) and cuts off the power source of the detection circuit 20. By pulling up the potential of the monitor terminal 18 (V− terminal) to the potential of the power source terminal 15 (VDD terminal), the control. circuit 32 can judge the existence of the connection of the charger 91 to the terminals 5 and 6. In addition, by cutting off the power source of the detection circuit 20, the control circuit 32 can reduce the power consumption of the battery protection circuit 10.

In step S31, the control circuit 32 judges whether the connection of the charger 91 to the terminals 5 and 6 is detected based on the potential of the monitor terminal 18 (V− terminal), in the pull-up state s2. The control circuit 32 judges whether the connection of the charger 91 to the terminals 5 and 6 is detected based on the potential of the monitor terminal 18 (V− terminal), until the connection of the charger 91 to the terminals 5 and 6 is detected. When the connection of the charger 91 to the terminals 5 and 6 is detected and the judgment result in step S31 is YES, the control circuit 32 performs a process of step S33. More particularly, in step S33, the control circuit 32 cancels the power save mode.

In step S33, the control circuit 32 turns on the switch 25, to cancel cutting off the power source of the detection circuit 20. As a result, the power save mode is canceled. The control circuit 32 then performs the process of step S17 to switch from the power save mode to the load monitor mode, and the control circuit 32 performs the judgment process of step S19 again.

In step S19, when the power source voltage Vd higher than the overdischarge reset voltage Vrel is not detected by the detection circuit 20 and the judgment result in step S19 is NO, the control circuit 32 performs the process of step S27. On the other hand, when the power source voltage Vd higher than the overdischarge reset voltage Vrel is detected by the detection circuit 20 and the judgment result in step S19 is YES, the control circuit 32 performs a process of step S21.

In step S21, the control circuit 32 judges whether the connection of the load 90 to the terminals 5 and 6 is non-existent, based on the potential of the monitor terminal 18 (V− terminal) detected by the monitor circuit 34. When the control circuit 32 judges that the connection of the load 90 to the terminals 5 and 6 exists and the judgment result in step S21 is NO, the control circuit 32 performs the judgment process of step S19 again. On the other hand, when the control circuit 32 judges that the connection of the load 90 to the terminals 5 and 6 is non-existent and the judgment result in step S21 is YES, the control circuit 32 performs a process of step S23.

In step S23, the control circuit 32 judges whether a predetermined overdischarge reset delay time trel has elapsed from a time when the power source voltage Vd higher than the overdischarge reset voltage Vrel is detected by the detection circuit 20 (or from a time when the non-existent connection of the load 90 to the terminals 5 and 6 is detected). The lapse of the overdischarge reset delay time trel is counted by the timer 31. When the control circuit 32 judges that the overdischarge reset delay time trel has not elapsed and the judgment result in step S23 is NO, the control circuit 32 performs the judgment process of step S19 again. On the other hand, when the control circuit 32 judges that the overdischarge reset delay time trel has elapsed and the judgment result in step S23 is YES, the control circuit 32 performs a process of step S25.

In step S25, the control circuit 32 turns on the discharge control transistor 2 to cancel stopping the discharge of the rechargeable battery 70, and cancels the pull-up of the potential of the monitor terminal 18 (V− terminal) to the potential of the power source terminal 15 (VDD terminal). The control circuit 32 performs the process of step S25 to permit discharge of the rechargeable battery 70, and restores the operation mode of the battery protection circuit 10 from the load monitor mode to a normal mode which permits discharge.

Figure 3:
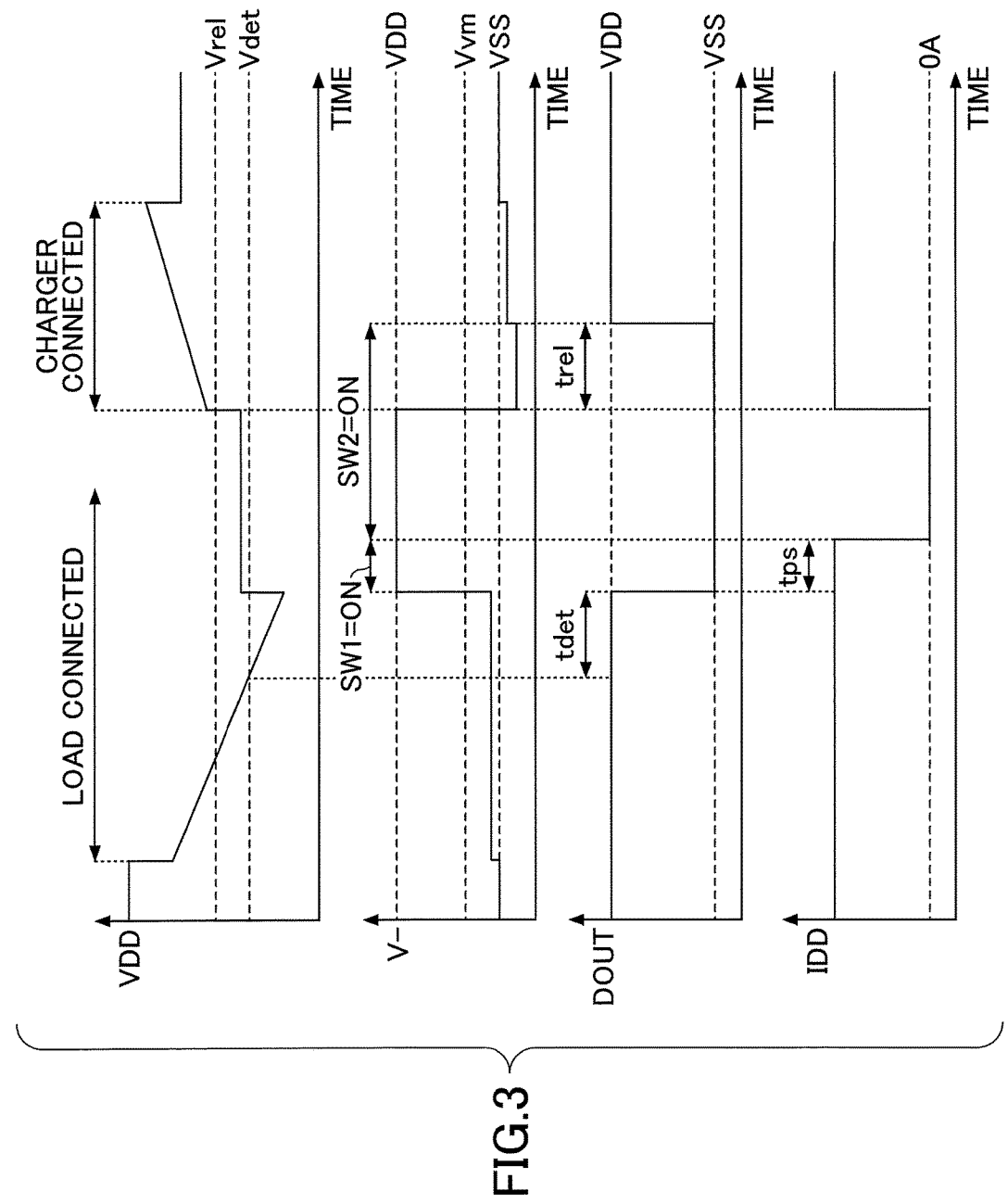
FIG. 3 is a timing chart for explaining a first operation example for a case in which the rechargeable battery protection integrated circuit is controlled by the control method illustrated in FIG. 2.

FIG. 3 is a timing chart for explaining a first operation example for a case in which the battery-protection circuit 10 is controlled by the control method illustrated in FIG. 2. A description of this first operation example illustrated in FIG. 3 will be given, by referring to FIG. 1 and FIG. 2.

Suppose that the control circuit 32 continues to detect the power source voltage Vd lower than the overdischarge detection voltage Vdet from a time when the power source voltage Vd lower than the overdischarge detection voltage Vdet is detected Until the overdischarge detection delay time tdet elapses (YES in step S13). In this case, the control circuit 32 outputs a signal that turns off the discharge control transistor 2 to stop the discharge of the rechargeable battery 70, and outputs a signal that turns on the first switch SW1 to pull-down the potential of the monitor terminal 18 (V− terminal) to the potential of the ground terminal 13 (VSS terminal). When at least the discharge control transistor 2 turns off, the potential of the monitor terminal 18 (V− terminal) rises to the potential of the power source terminal 115 (VDD terminal) due to the resistor 14 and the load 90. In addition, when the first switch SW1 turns on, the load monitor mode is started (step S17).

The potential of the power source terminal 15 (VDD terminal) during the discharge of the rechargeable battery 70 becomes lower than an actual potential of a cell itself inside the rechargeable battery 70, by an amount corresponding to a voltage drop caused by a discharge current output from the rechargeable battery 70 and an internal impedance coupled to the cell of the rechargeable battery 70. For this reason, when the overdischarge is detected and the discharge stops, the amount corresponding to the voltage drop no longer occurs, and the potential of the power source terminal 15 (VDD terminal) rises as illustrated in FIG. 3.

FIG. 3 illustrates a case in which the power source voltage Vd does not rise up to the overdischarge reset voltage Vrel, due to the rise in the potential of the power source terminal 15 (VDD terminal) at the time when the discharge stops. In a case in which the power source voltage Vd higher than the overdischarge reset voltage Vrel is not detected by the detection circuit 20 until the power save transition time tps elapses in the pull-down state s1, the control circuit 32 cancels the pull-down of the potential of the monitor terminal 18 (V− terminal) to the potential of the ground terminal 13 (VSS terminal) (YES in step S27). In FIG. 3, the control circuit 32 turns off the first switch SW1 and turns on the second switch SW2, to cause a transition from the pull-down state s1 to the pull-up state s2. In addition, the control circuit 32 controls the operation mode of the battery protection circuit 10 to make a transition to the power save mode (step S29). For example, turns of the switch 25 to cut off the power source of the detection circuit 20, and reduces a consumption current IDD of the battery protection circuit 10 (that is, a current input from the power source terminal 15 (VDD terminal) and output from the ground terminal 13 (VSS terminal)). The consumption current IDD of the battery protection circuit 10 reduces approximately to zero Ampere (0 A), as illustrated in FIG. 3.

In a case in which the monitor circuit 34 detects that the potential of the monitor terminal 18 (V-terminal) decreases below the reference potential Vvm in the pull-up state s2, the control circuit 32 judges that the charger 91 is connected to the terminals 5 and 6 (YES in step S31). For example, the control circuit 32 turns on the switch 25 to cancel the cutoff of the power source of the detection circuit 20. Accordingly, the consumption current IDD of the battery protection circuit 10 rises. In addition, due to the canceling of the cutoff of the power source of the detection circuit 20 (or resuming of the power supply), the detection circuit 20 can again monitor the power source voltage Vd.

The rechargeable battery 70 is charged when the charger 91 is connected to the terminals 5 and 6, and thus, when the load 90 is disconnected from the terminals 5 and 6, the power source voltage Vd rises. Accordingly, the control circuit 32 in the load monitor mode (step S17) detects the power source voltage Vd higher than the overdischarge reset voltage Vrel by the detection circuit 20 in the pull-up state s2 (YES in step S19). Because the monitor circuit 34 detects the decrease of the potential of the monitor terminal 18 (V− terminal) below the reference potential Vvm in the pull-up state s2, the control circuit 32 judges that the connection of the load 90 to the terminals 5 and 6 is non-existent (YES in step S21).

Suppose that the control circuit 32 detects that the power source voltage Vd higher than the overdischarge reset voltage Vrel is continuously detected until the overdischarge reset delay time trel elapses from the time when the power source voltage Vd higher than the overdischarge reset voltage Vrel is detected (YES in step S23). In this case, the control circuit 32 outputs a signal that turns on the discharge control transistor 2, to cancel stopping the discharge of the rechargeable battery 70, and outputs a signal that turns off the second switch SW2. Because the discharge control transistor 2 turns on, the discharge of the rechargeable battery 70 reset from the overdischarge state is permitted (step S25).

Figure 4:
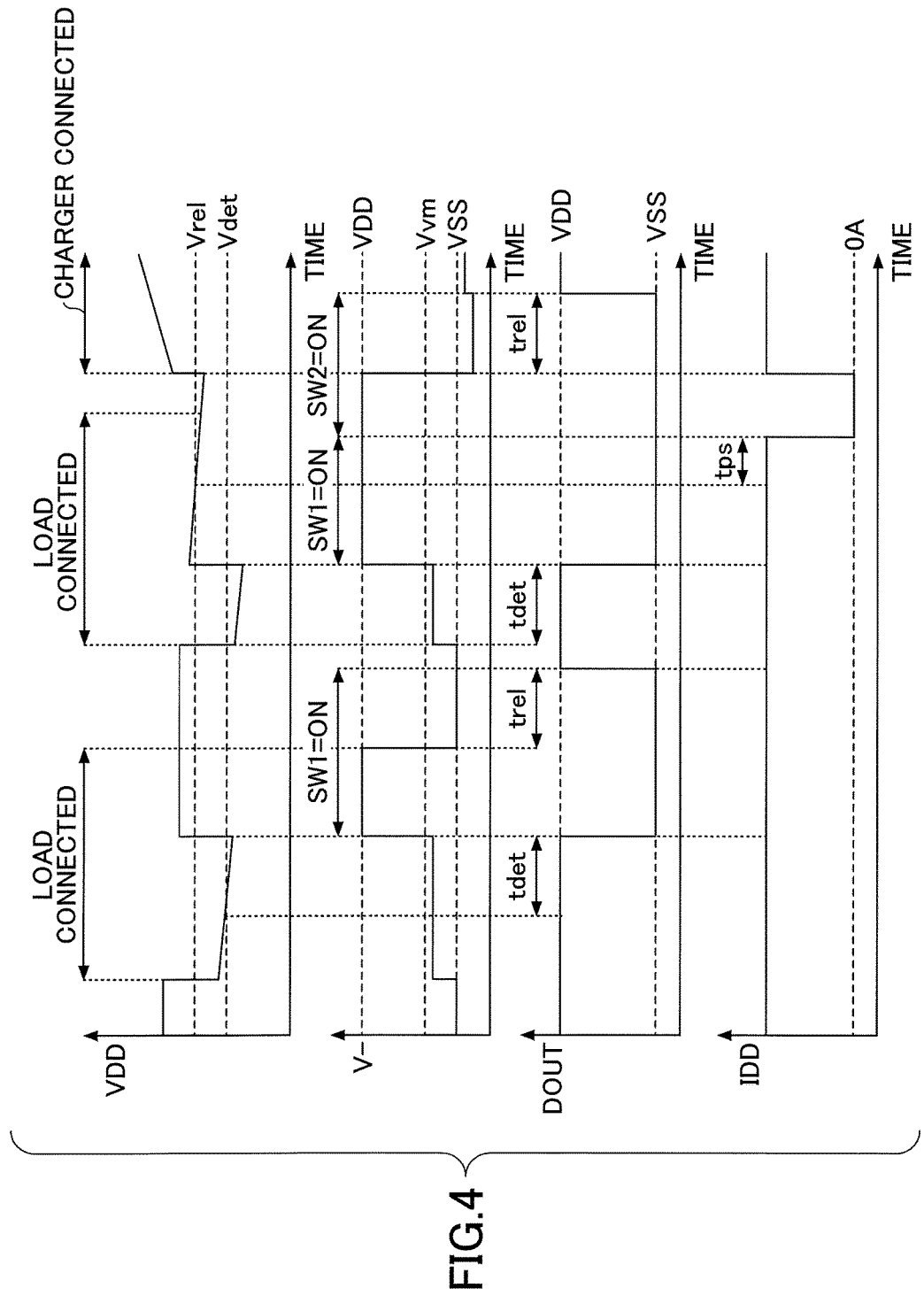
FIG. 4 is a timing chart for explaining a second operation example for the case in which the rechargeable battery protection integrated circuit is controlled by the control method illustrated in FIG. 2.

FIG. 4 is a timing chart for explaining a second operation example for the case in which the battery protection circuit 10 is controlled by the control method illustrated in FIG. 2. A description of this first operation example illustrated in FIG. 4 will be given, by referring to FIG. 1 and FIG. 2.

Suppose that the control circuit 32 continues to detect the power source voltage Vd lower than the overdischarge detection voltage Vdet from a time when the power source voltage Vd lower than the overdischarge detection voltage Vdet is detected until the overdischarge detection delay time tdet elapses (YES in step S13). In this case, the control circuit 32 outputs a signal that turns off the discharge control transistor 2 to stop the discharge of the rechargeable battery 70, and outputs a signal that turns on the first switch SW1 to pull-down the potential of the monitor terminal 18 (V− terminal) to the potential of the ground terminal 13 (VSS terminal). When at least the discharge control transistor 2 turns off, the potential of the monitor terminal 18 (V− terminal) rises to the potential of the power source terminal 115 (VDD terminal) due to the resistor 14 and the load 90. In addition, when the first switch SW1 turns on, the load monitor mode is started (step S17).

The potential of the power source terminal 15 (VDD terminal) during the discharge of the rechargeable battery 70 becomes lower than an actual potential, by an amount corresponding to a voltage drop caused by a discharge current output from the rechargeable battery 70 and an internal impedance of the rechargeable battery 70. For this reason, when the overdischarge is detected and the discharge stops, the amount corresponding to the voltage drop disappears, and the potential of the power source terminal 15 (VDD terminal) rises as illustrated in FIG. 4.

FIG. 4 illustrates a case in which the power source voltage Vd rises above the overdischarge reset voltage Vrel, due to the rise in the potential of the power source terminal 15 (VDD terminal) at the time when the discharge stops. The power source voltage Vd higher than the overdischarge reset voltage Vrel is detected by the detection circuit 20 before the power save transition time tps elapses in the pull-down state s1 (YES in step S19). Hence, when the load 90 is disconnected from the terminals 5 and 6, the potential at the monitor terminal 18 (V− terminal) becomes lower than the reference potential Vvm. Accordingly, because the monitor circuit 34 detects that the potential of the monitor terminal 18 (V− terminal) decreases below the reference potential Vvm in the pull-down state s1, the control circuit 32 judges that the connection of the load 90 to the terminals 5 and 6 is non-existent (YES in step S21).

In addition, suppose that the control circuit 32 detects that the power source voltage Vd higher than the overdischarge reset voltage Vrel is continuously detected until the overdischarge reset delay time trel elapses from the time when the power source voltage Vd higher than the overdischarge reset voltage Vrel is detected (YES in step S23). In this case, the control circuit 32 outputs a signal that turns on the discharge control transistor 2, to cancel stopping the discharge of the rechargeable battery 70, and outputs a signal that turns off the first switch SW1. Because the discharge control transistor 2 turns on, the discharge of the rechargeable battery 70 reset from the overdischarge state is permitted (step S25).

Further, after the power source voltage Vd exceeds the overdischarge reset voltage Vrel due to the rise in the potential of the power source terminal 15 (VDD terminal) at the time when the discharge stops, there are cases in which the power source voltage Vd decreases below the overdischarge reset voltage Vrel (refer to the latter half part of FIG. 4). In this case, the control circuit 32 judges that the power source voltage Vd higher than the overdischarge reset voltage Vrel is not detected by the detection circuit 20 in the pull-down state s1 (NO in step S19). In a case in which the power source voltage Vd higher than the overdischarge reset voltage Vrel is not detected by the detection circuit 20 until the power save transition time tps elapses in the pull-down state s1, the control circuit 32 cancels the pull-down of the potential of the monitor terminal 18 (V− terminal) to the potential of the ground terminal 13 (VSS terminal) (YES in step S27). The operation performed thereafter is similar to the example illustrated in FIG. 3, and a description thereof will be omitted.

According to this embodiment, the discharge of the rechargeable battery 70 that is reset from the overdischarge state will not be permitted unless the load 90 is disconnected from the terminals 5 and 6. For this reason, compared to a case in which the reset from the overdischarge state is judged solely from a comparison of the overdischarge reset voltage and the power source voltage, it is prevent the detection and the cancellation of the overdischarge reset from being repeated. In addition, the charge of the rechargeable battery 70 can be efficiently used up, while simultaneously reducing the consumption current at the time of the overdischarge.

According to each of the embodiment described above, it is possible to provide a rechargeable battery protection integrated circuit, a rechargeable battery protection device, and a battery pack, capable of preventing a small current from flowing from rechargeable battery in a discharge state of the rechargeable battery.

Further, the present invention is not limited to these embodiments, but various variations and modifications may be made without departing from the scope of the present invention.

For example, the positions where the charge control transistor 1 and the discharge control transistor 2 are arranged in FIG. 1 may be interchanged.

In addition, the charge control transistor 1 and the discharge control transistor 2 may be inserted in the positive current path 9a instead of being inserted in the negative current path 9b.

What is claimed is:

1. A rechargeable battery protection integrated circuit that protects a rechargeable battery from overdischarge, by turning off a discharge control transistor inserted in series in a current path between a negative electrode of the rechargeable battery and a negative terminal that is coupled to ground of a load or a charger, the rechargeable battery protection integrated circuit comprising:

a power source terminal configured to electrically connect to a positive electrode of the rechargeable battery;

a ground terminal configured to electrically connect to the negative electrode of the rechargeable battery;

a monitor terminal configured to electrically connect to the negative terminal;

a detection circuit configured to detect a power source voltage between the power source terminal and the ground terminal; and a control circuit configured to pull down a potential of the monitor terminal to a potential of the ground terminal by turning off the discharge control transistor and stopping discharge of the rechargeable battery, in a case in which the detection circuit detects the power source voltage lower than an overdischarge detection voltage, wherein the control circuit cancels pull-down of the potential of the monitor terminal to the potential of the ground terminal, in a case in which the power source voltage higher than an overdischarge reset voltage is not detected by the detection circuit until a predetermined time elapses in a first state in which the discharge of the rechargeable battery is stopped and the potential of the monitor terminal is pulled down to the potential of the ground terminal.

2. The rechargeable battery protection integrated circuit as claimed in claim 1, wherein the control circuit switches from pulling down the potential of the monitor terminal to the potential of the ground terminal to pulling up the potential of the monitor terminal to a potential of the power source terminal, in a case in which the power source voltage higher than the overdischarge reset voltage is not detected by the detection circuit until the predetermined time elapses in the first state.

3. The rechargeable battery protection integrated circuit as claimed in claim 2, wherein the control circuit cancels stopping the discharge of the rechargeable battery by turning on the discharge control transistor, and cancels pull-up of the potential of the monitor terminal to the potential of the power source terminal, in a case in which a connection of the charger to the rechargeable battery is detected based on the potential of the monitor terminal and the power source voltage higher than the overdischarge reset voltage is detected by the detection circuit, in a second state in which the discharge of the rechargeable battery is stopped and the potential of the monitor terminal is pulled up to the potential of the power source terminal.

4. The rechargeable battery protection integrated circuit as claimed in claim 2, wherein the control circuit cuts off a power source of the detection circuit by pulling up the potential of the monitor terminal to the potential of the power source terminal, in a case in which the power source voltage higher than the overdischarge reset voltage is not detected by the detection circuit until the predetermined time elapses in the first state.

5. The rechargeable battery protection integrated circuit as claimed in claim 4, wherein the control circuit cancels cutting off the power source of the detection circuit, in a case in which the connection of the charger to the rechargeable battery is detected based on the potential of the monitor terminal in a second state in which the discharge of the rechargeable battery is stopped and the potential of the monitor terminal is pulled up to the potential of the power source terminal, and the control circuit turns on the discharge control transistor to cancel stopping the discharge of the rechargeable battery, in a case in which the power source voltage higher than the overdischarge reset voltage is detected by the detection circuit in the second state.

6. The rechargeable battery protection integrated circuit as claimed in claim 1, wherein the control circuit monitors an existence of a connection of the load to the rechargeable battery based on the potential of the monitor terminal, in a case in which the power source voltage higher than the overdischarge reset voltage is detected by the detection circuit until the predetermined time elapses in the first state.

7. The rechargeable battery protection integrated circuit as claimed in claim 6, wherein the control circuit turns on the discharge control transistor to cancel stopping the discharge of the rechargeable battery, and cancels pull-down of the potential of the monitor terminal to the potential of the ground terminal, in a case in which a non-existence of the connection of the load to the rechargeable battery is detected based on the potential of the monitor terminal.

8. The rechargeable battery protection integrated circuit as claimed in claim 6, wherein the control circuit judges whether the power source voltage higher than the overdischarge reset voltage is detected by the detection circuit, in a case in which a non-existence of the connection of the load to the rechargeable battery is detected based on the potential of the monitor terminal.

9. A rechargeable battery protection device comprising:

a discharge control transistor inserted in series in a current path between a negative electrode of a rechargeable battery and a negative terminal that is coupled to ground of a load or a charger; and a rechargeable battery protection integrated circuit that protects the rechargeable battery from overdischarge, by turning off the discharge control transistor, wherein the rechargeable battery protection integrated circuit includes a power source terminal configured to electrically connect to a positive electrode of the rechargeable battery;

a ground terminal configured to electrically connect to the negative electrode of the rechargeable battery;

a monitor terminal configured to electrically connect to the negative terminal;

a detection circuit configured to detect a power source voltage between the power source terminal and the ground terminal; and a control circuit configured to pull down a potential of the monitor terminal to a potential of the ground terminal by turning off the discharge control transistor and stopping discharge of the rechargeable battery, in a case in which the detection circuit detects the power source voltage lower than an overdischarge detection voltage, wherein the control circuit cancels pull-down of the potential of the monitor terminal to the potential of the ground terminal, in a case in which the power source voltage higher than an overdischarge reset voltage is not detected by the detection circuit until a predetermined time elapses in a first state in which the discharge of the rechargeable battery is stopped and the potential of the monitor terminal is pulled down to the potential of the ground terminal.

10. The rechargeable battery protection device as claimed in claim 9, wherein the control circuit of the rechargeable battery protection integrated circuit switches from pulling down the potential of the monitor terminal to the potential of the ground terminal to pulling up the potential of the monitor terminal to a potential of the power source terminal, in a case in which the power source voltage higher than the overdischarge reset voltage is not detected by the detection circuit until the predetermined time elapses in the first state.

11. The rechargeable battery protection device as claimed in claim 10, wherein the control circuit of the rechargeable battery protection integrated circuit cancels stopping the discharge of the rechargeable battery by turning on the discharge control transistor, and cancels pull-up of the potential of the monitor terminal to the potential of the power source terminal, in a case in which a connection of the charger to the rechargeable battery is detected based on the potential of the monitor terminal and the power source voltage higher than the overdischarge reset voltage is detected by the detection circuit, in a second state in which the discharge of the rechargeable battery is stopped and the potential of the monitor terminal is pulled up to the potential of the power source terminal.

12. The rechargeable battery protection device as claimed in claim 10, wherein the control circuit of the rechargeable battery protection integrated circuit cuts off a power source of the detection circuit by pulling up the potential of the monitor terminal to the potential of the power source terminal, in a case in which the power source voltage higher than the overdischarge reset voltage is not detected by the detection circuit until the predetermined time elapses in the first state.

13. The rechargeable battery protection device as claimed in claim 9, wherein the control circuit of the rechargeable battery protection integrated circuit monitors an existence of a connection of the load to the rechargeable battery based on the potential of the monitor terminal, in a case in which the power source voltage higher than the overdischarge reset voltage is detected by the detection circuit until the predetermined time elapses in the first state.

14. The rechargeable battery protection device as claimed in claim 13, wherein the control circuit of the rechargeable battery protection integrated circuit turns on the discharge control transistor to cancel stopping the discharge of the rechargeable battery, and cancels pull-down of the potential of the monitor terminal to the potential of the ground terminal, in a case in which a non-existence of the connection of the load to the rechargeable battery is detected based on the potential of the monitor terminal.

15. The rechargeable battery protection device as claimed in claim 13, wherein the control circuit of the rechargeable battery protection integrated circuit judges whether the power source voltage higher than the overdischarge reset voltage is detected by the detection circuit, in a case in which a non-existence of the connection of the load to the rechargeable battery is detected based on the potential of the monitor terminal.

16. A battery pack comprising:
a rechargeable battery;
a discharge control transistor inserted in series in a current path between a negative electrode of the rechargeable battery and a negative terminal that is coupled to ground of a load or a charger; and
a rechargeable battery protection integrated circuit that protects the rechargeable battery from overdischarge, by turning off the discharge control transistor,
wherein the rechargeable battery protection integrated circuit includes a power source terminal configured to electrically connect to a positive electrode of the rechargeable battery;
a ground terminal configured to electrically connect to the negative electrode of the rechargeable battery;
a monitor terminal configured to electrically connect to the negative terminal;
a detection circuit configured to detect a power source voltage between the power source terminal and the ground terminal; and
a control circuit configured to pull down a potential of the monitor terminal to a potential of the ground terminal by turning off the discharge control transistor and stopping discharge of the rechargeable battery, in a case in which the detection circuit detects the power source voltage lower than an overdischarge detection voltage,
wherein the control circuit cancels pull-down of the potential of the monitor terminal to the potential of the ground terminal, in a case in which the power source voltage higher than an overdischarge reset voltage is not detected by the detection circuit until a predetermined time elapses in a first state in which the discharge of the rechargeable battery is stopped and the potential of the monitor terminal is pulled down to the potential of the ground terminal.

17. The battery pack as claimed in claim 16, wherein the control circuit of the rechargeable battery protection integrated circuit switches from pulling down the potential of the monitor terminal to the potential of the ground terminal to pulling up the potential of the monitor terminal to a potential of the power source terminal, in a case in which the power source voltage higher than the overdischarge reset voltage is not detected by the detection circuit until the predetermined time elapses in the first state.

18. The battery pack as claimed in claim 16, wherein the control circuit of the rechargeable battery protection integrated circuit monitors an existence of a connection of the load to the rechargeable battery based on the potential of the monitor terminal, in a case in which the power source voltage higher than the overdischarge reset voltage is detected by the detection circuit until the predetermined time elapses in the first state.

19. The battery pack as claimed in claim 18, wherein the control circuit of the rechargeable battery protection integrated circuit turns on the discharge control transistor to cancel stopping the discharge of the rechargeable battery, and cancels pull-down of the potential of the monitor terminal to the potential of the ground terminal, in a case in which a non-existence of the connection of the load to the rechargeable battery is detected based on the potential of the monitor terminal.

20. The battery pack as claimed in claim 18, wherein the control circuit of the rechargeable battery protection integrated circuit judges whether the power source voltage higher than the overdischarge reset voltage is detected by the detection circuit, in a case in which a non-existence of the connection of the load to the rechargeable battery is detected based on the potential of the monitor terminal.

* * * * *